United States Patent
Ratigan

(10) Patent No.: US 9,010,264 B1
(45) Date of Patent: *Apr. 21, 2015

(54) METHOD FOR USING A RAT GUARD

(71) Applicant: Edward Ratigan, Graham, NC (US)

(72) Inventor: Edward Ratigan, Graham, NC (US)

(73) Assignee: Fjord, Inc., Graham, NC (US)

( * ) Notice: Subject to any disclaimer, the term of this patent is extended or adjusted under 35 U.S.C. 154(b) by 74 days.

This patent is subject to a terminal disclaimer.

(21) Appl. No.: 14/020,975

(22) Filed: Sep. 9, 2013

Related U.S. Application Data

(63) Continuation of application No. 12/909,364, filed on Oct. 21, 2010, now Pat. No. 8,528,493.

(51) Int. Cl.
| | |
|---|---|
| *B63B 21/12* | (2006.01) |
| *A01M 19/00* | (2006.01) |
| *A01M 29/18* | (2011.01) |
| *A01M 29/24* | (2011.01) |
| *A01M 29/30* | (2011.01) |
| *H05C 1/00* | (2006.01) |

(52) U.S. Cl.
CPC ............ *B63B 21/12* (2013.01); *A01M 19/00* (2013.01); *A01M 29/18* (2013.01); *A01M 29/24* (2013.01); *A01M 29/30* (2013.01); *H05C 1/00* (2013.01)

(58) Field of Classification Search
CPC ...... B63B 21/12; A01M 19/00; A01M 29/16; A01M 29/18; A01M 29/24; A01M 29/30; H05C 1/00; H05C 1/04; H05C 1/06
USPC ............ 114/221 R; 43/98, 124; 52/101, 107; 119/57.9, 719; 340/384.2; 361/232; 367/139
See application file for complete search history.

(56) References Cited

U.S. PATENT DOCUMENTS

| | | | |
|---|---|---|---|
| 1,401,540 A | 12/1921 | Konig | 114/221 R |
| 1,486,417 A | 3/1924 | Cheely | 114/221 R |
| 1,849,016 A | 3/1932 | O'Connell | 114/221 R |
| 2,959,147 A | 11/1960 | Reubenstine | 114/221 |
| 3,005,436 A | 10/1961 | Caldwell | 114/221 |

(Continued)

FOREIGN PATENT DOCUMENTS

SU    1539126 A    1/1990    ............... B63B 21/12

OTHER PUBLICATIONS

Two (2) page printout from the website: foothillsproducts.com showing "Offboard Mooring Line Shields: Government Applications"; Copyright 2003 Foothills Products, Inc.

(Continued)

*Primary Examiner* — Ajay Vasudeva
(74) *Attorney, Agent, or Firm* — Blake P. Hurt

(57) ABSTRACT

A rat guard and method utilizing a flexible shield affixed to a plastic sheath positioned on a mooring line to prevent entry onto or exit from the ship by vermin. An electric grid is positioned on an insulated pad on the sheath which is electrically connected to the shield for receiving power from an acoustical generator also connected to the shield and spaced therefrom. The acoustical generator directs ultrasonic acoustic signals in a variable frequency range toward the shield to frighten rats or other vermin therefrom. Should the acoustical signals not deter the vermin, the electric grid will shock any vermin making contact therewith to cause harm and frighten. The shield provides another obstacle to prevent advancement and is affixed to the sheath on the mooring line. The shield is flexible and remains in place during high winds and other adverse weather conditions.

18 Claims, 4 Drawing Sheets

(56) References Cited

U.S. PATENT DOCUMENTS

| | | | | |
|---|---|---|---|---|
| 3,058,103 | A | 10/1962 | Evans | 340/384 |
| 3,194,203 | A | 7/1965 | Thornton | 114/221 |
| 4,163,966 | A | 8/1979 | Mounce | 340/15 |
| 4,484,315 | A | 11/1984 | Hall | 367/139 |
| 4,562,561 | A | 12/1985 | Ackley | 367/139 |
| 4,933,918 | A | 6/1990 | Landsrath et al. | 367/139 |
| 4,949,216 | A | 8/1990 | Djukastein | 361/232 |
| 5,184,415 | A | 2/1993 | Hattenbach et al. | 43/58 |
| 5,214,619 | A | 5/1993 | Yoshida | 367/139 |
| 5,570,652 | A | 11/1996 | Ferland | 114/221 R |
| 5,864,096 | A | 1/1999 | Williams et al. | 174/139 |
| 6,550,409 | B1 | 4/2003 | Smith | 114/221 |
| 8,528,493 | B1 * | 9/2013 | Ratigan | 114/221 R |
| 2009/0034369 | A1 | 2/2009 | Hill | 367/139 |

OTHER PUBLICATIONS

Four (4) page instruction, product listing from Future (Thailand) Corporation Co., LTD. for multipurpose box; undated.

Five (5) page printout from comforthouse.com showing "PestChaser" FAQs; Copyright 1992-2009, Comfort House.

One (1) page product description of "Black & Decker Electronic Pest Repellant Model EX900A"; undated.

Six (6) page printout from highvoltageconnection.com showing an article by Evan Mayerhoff entitled: "The Electric Shock Questions Effects and Symptoms"; Copyright 2005, High Voltage Connection, Inc.

Three (3) page printout from washingtontimes.com showing an article by Shelley Widhalm entitled: "Startled pests face makers of ultrasonic control units"; Published Aug. 5, 2004; Copyright 2005, News World Communications, Inc.

Three (3) page printout from swe.org showing: "Lesson Plan for Grades 5-8 Electricity" undated.

One (1) page printout from carrionsound.com showing: "Horrible Six Photocell Insect Synth Light Controls Sequence, Pitch, Filtering and Cross Modulation Circuit Bent into Existence" by Dave Wright Jul. 2004.

Two (2) page printout from biconet.com showing: "Victor® Mini Sonic PestChaser®"; Copyright 2004 Biconet.

* cited by examiner

METHOD FOR USING A RAT GUARD

This is a continuation of and claims benefits under prior application Ser. No. 12/909,364 filed 21 Oct. 2010, now U.S. Pat. No. 8,528,493, which is incorporated by reference in its entirety herein.

FIELD OF THE INVENTION

The invention herein pertains to preventing rats and other vermin from boarding ships or disembarking along a mooring line. Particularly a method for utilizing a rat guard having a shield, an electric grid and an acoustic generator for placement on a mooring line to deter and prevent vermin entry and exit.

DESCRIPTION OF THE PRIOR ART AND OBJECTIVES OF THE INVENTION

Rats and similar pests have attempted to board and disembark docked ships for centuries. Various types of guards have been affixed to mooring lines and in more recent years acoustical generators have been in use which frighten and scare rats and other pests from homes, warehouses and the like. However, none of the prior devices have been sufficiently effective when used for ship protection. Usual shields affixed to mooring lines can slide along the mooring line once in place due to winds or inclement weather. If the shield moves to a position close in proximity to the pier the rats simply jump over the shield onto the mooring line and proceed to the ship. In other cases rats will climb the shield and bypass it. Rats can become immune to a particular acoustic signal wavelength produced and proceed as if the signals were not present. Rats which board ships in cargo and otherwise often attempt to leave the ship along the mooring line when it reaches port. As rats often carry diseases, port authorities are also concerned that rats and other vermin may leave a ship and cause disease outbreaks.

Thus in view of the disadvantages and inefficiencies of current devices and methods available, the present invention was conceived and one of its objectives is to provide a method for use of a rat guard which will stop vermin from boarding and disembarking ships along the mooring line.

It is another objective of the present invention to provide a method of using a rat guard which will keep rats and other vermin from boarding and disembarking ships by the use of a combination mooring line shield, electric grid and acoustical generator in which the ultrasonic frequency of the acoustic signals can be varied as desired.

It is still another objective of the present invention to provide a method of using a rat guard having a shield which remains in place on the mooring line even in strong winds or other inclement weather.

It is yet another objective of the present invention to provide a method of using a rat guard which can simultaneously and/or independently produce and deliver an acoustic signal and an electric shock.

It is a further objective of the present invention to provide a method of using a rat guard which is inexpensive to manufacture and sell and which is easy to position on a mooring line.

It is still a further objective of the present invention to provide a method of using a rat guard which can produce an electric shock from a discharged capacitor of 1 to 4 mA at 0.5 seconds duration with a means to vary the level of shock intensity.

It is yet a further objective of the present invention to provide a method of using a rat guard which can utilize either direct or alternating current and is housed within a waterproof case that will resist moderate impact with a hard surface.

Various other objectives and advantages of the present invention will become apparent to those skilled in the art as a more detailed description is set forth below.

SUMMARY OF THE INVENTION

The aforesaid and other objectives are realized by providing a method of using a rat guard for preventing vermin from boarding and disembarking ships along a mooring line. The rat guard includes a shield formed from a non-absorbent flexible material which is circular in shape and which includes a central opening and radial slot. The central opening and radial slot include a micro-hook material to assist in placement of the shield onto a mooring line and preventing sliding and slipping of the shield once in place. A sheath such as formed from polyester is first affixed to the mooring line at a desired location and the shield is then placed thereon. An insulating grid pad is positioned around the sheath and an electric grid is affixed to the sheath over top the insulating grid pad and is electronically connected to the shield. Conductors from the shield are attached to the housing of an acoustical generator which in turn is affixed, for example to the side of a ship. When the electric grid and acoustical generator are activated an approaching rat or other vermin will be dissuaded from advancing along the mooring line by first the acoustical signals generated, secondly by the shock received as the rat touches the electric grid and thirdly by the obstacle presented by the shield. This triple deterrent is effective in discouraging the rat and other vermin from attempting to board or disembark the ship along the mooring line.

DETAILED DESCRIPTION OF THE PREFERRED EMBODIMENT AND OPERATION OF THE INVENTION

Figure 1:
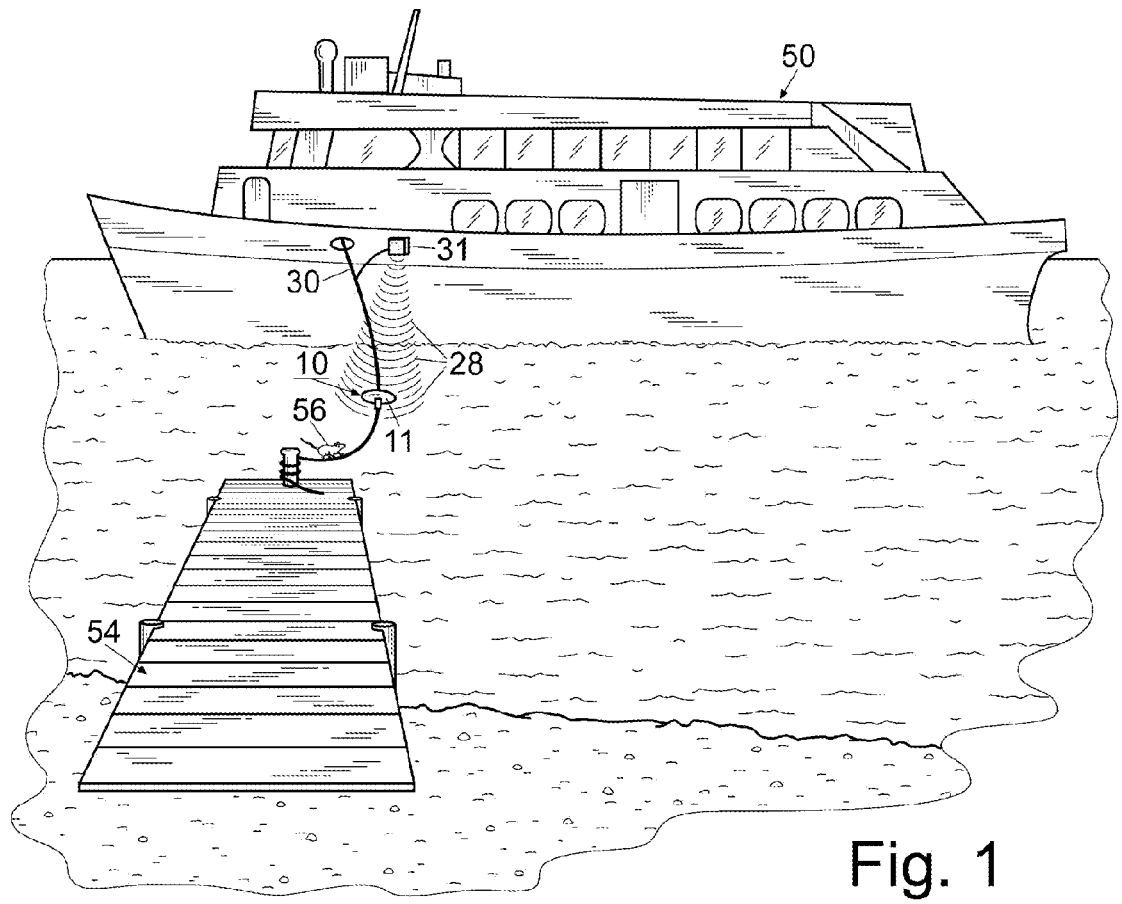
FIG. 1 illustrates a typical ship with the invention displayed in schematic representation on the mooring line.
Figure 5:
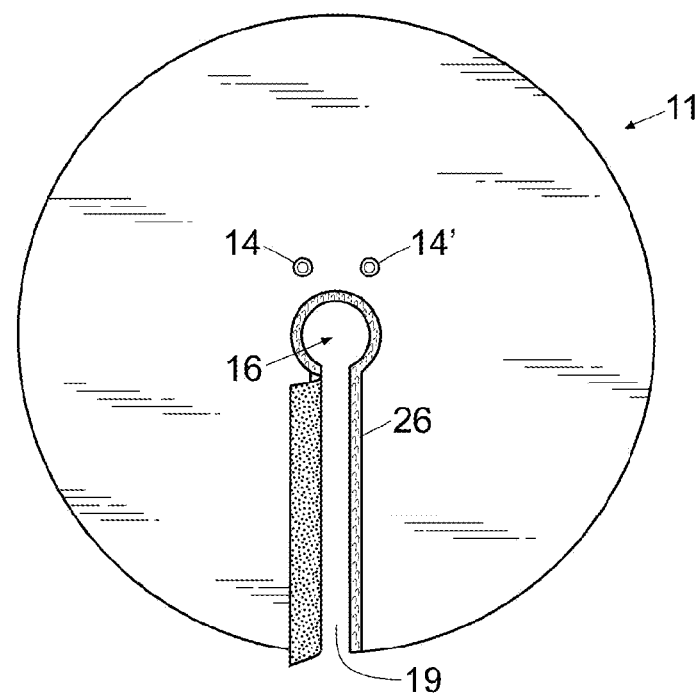
FIG. 5 pictures a front view of the shield as removed from the mooring line and disconnected from the acoustical generator.

For a better understanding of the invention and its method of operation, turning now to the drawings, FIG. 1 illustrates preferred rat guard 10 in a typical installation. As shown, ship 50 is affixed to pier 54 by conventional mooring line 30 having rat guard 10 affixed thereto. Preferred shield 11 as shown in FIGS. 1, 2, 3, 4 and 5 consists of a circular disk having a central opening 16 and a radial slot 19 in communication therewith for placement of shield 11 on mooring line 30. Shield 11 can be made from a non-absorbent flexible material such as a thin impact-resistant plastic, a textile material or fabric coated with a polyurethane, rubber or other suitable materials. The exact diameter of shield 11 may vary depending on the end user's needs but will preferably have a diameter of approximately twenty-four inches (61 cm). Shield 11 is somewhat flexible and can sustain repeated bending without cracking or splitting and is preferably yellow in color having a warning "Caution—Electrical Shock" printed on each side in red letters. Micro-hook material 26 is placed around central opening 16 and radial slot 19 as shown in FIG. 5 to stabilize and affix shield 11 on mooring line 30. Micro-hook material 26 is conventionally used in hook and loop fasteners.

Figure 2:
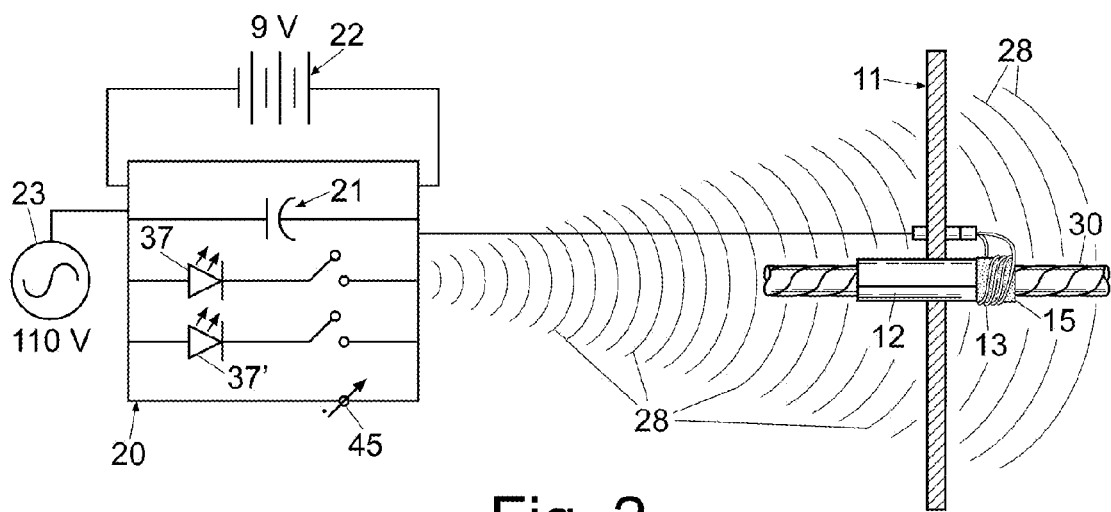
FIG. 2 is a schematic diagram of certain of the electrical components and their connection to the shield.
Figure 3:
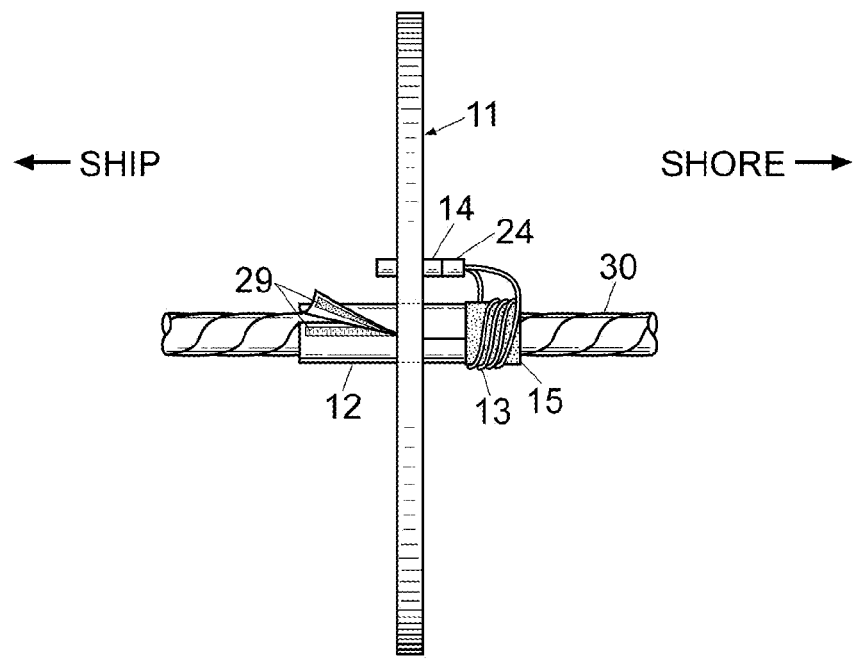
FIG. 3 depicts a side elevational view of the shield on the mooring line.
Figure 4:
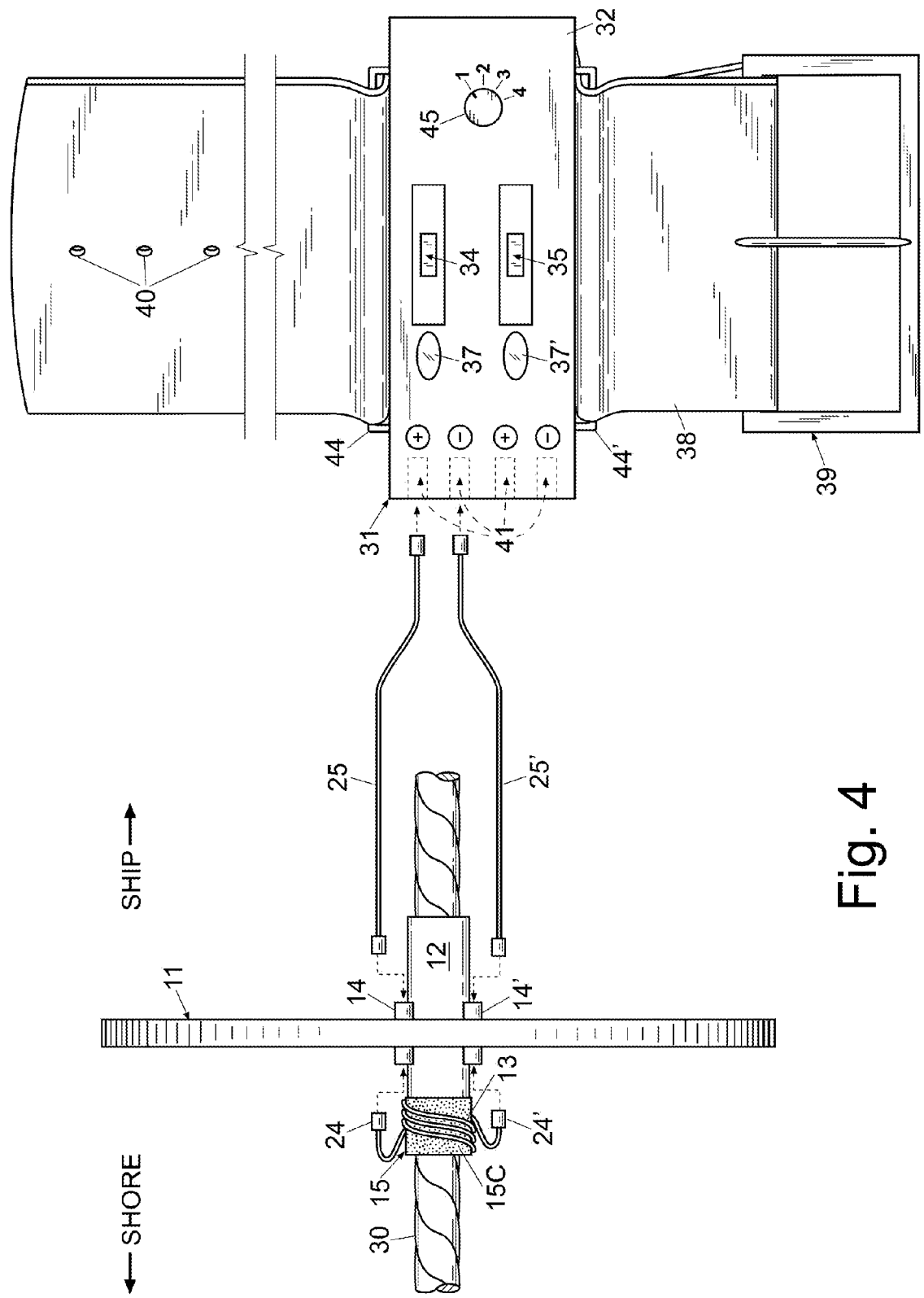
FIG. 4 demonstrates a top view of the shield as seen in FIG. 3 schematically connected to the acoustical generator with the speaker removed for clarity purposes.

A polyester sheath such as sheath 12 as seen in FIGS. 2, 3 and 4 surrounds mooring line 30 and is held in place by a typical fastener such as hook and loop material 29 (FIG. 3). Other fasteners could also be used such as straps, snaps or otherwise. Sheath 12 is positioned on mooring line 30 prior to placement of shield 11 and secured tightly therearound by closure of hook and loop material 29. Micro-hook material 26 of shield 11 is then manually separated along radial slot 19 for access thereto by mooring line 30 whereby central opening 16 can be positioned on sheath 12. Micro-hook material 26 along central opening 16 frictionally engages sheath 12 and radial slot 19 is pressed together for closure. Shield 11 is thereby engaged with sheath 12 on mooring line 30 with micro-hook material 26 assisting the prevention of slipping or sliding of shield 11 along mooring line 30. Sheath 12 also supports insulated grid pad 15 thereon. Insulated grid pad 15 consists of durable fabric such as formed from a polypropylene material which is placed on sheath 12. Insulated pad 15 has a rubber (natural or synthetic) coating 15C as seen in FIGS. 3 and 4 to insulate electric grid 13 from sheath 12.

Electric grid 13 consists of a wound electrical conductor as shown in FIG. 4. Electric grid 13 is connected by male plugs 24, 24' respectively to electrical connectors 14, 14' on shield 11. Shield electrical connectors 14, 14' are attached by conductors 25, 25' to electrical circuitry 20 of acoustical generator 31 shown in FIGS. 2, 4, 6, 7 and 8. In another embodiment electric grid 13 could also be placed on both sides of shield 11 simultaneously, such as to shock rats 56, should they attempt to either disembark or board ship 50 (only one placement of grid 13 is shown for simplicity purposes).

Figure 6:
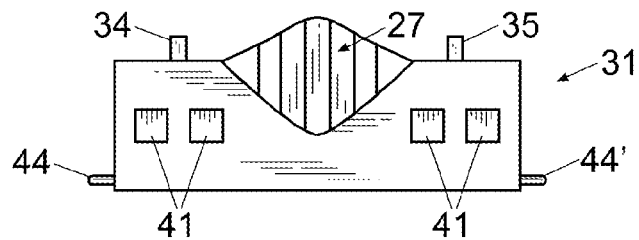
FIG. 6 illustrates a front view of the acoustical generator.
Figure 7:
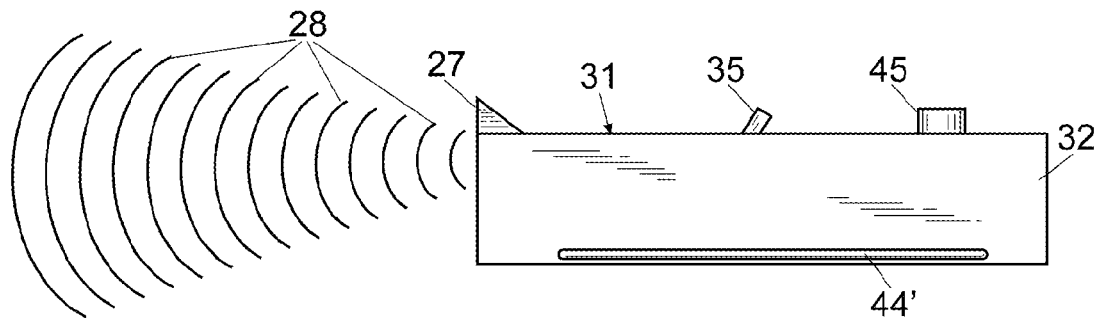
FIG. 7 shows a side view of the acoustical generator.

Acoustical generator 31 includes housing 32 which may be formed from a thin aluminum or other durable material such as suitable plastic with speaker 27 (FIG. 6). Acoustical generator housing 32 is preferably formed in a rectangular shape having a length of about six inches (15.24 cm), a width of about four inches (10.16 cm) and a height of about two inches (5.08 cm) although other dimensions and shapes could be utilized. As shown in FIGS. 6 and 7 speaker 27 broadcasts ultrasonic acoustical signals 28 toward the shield as shown in schematic representation in FIGS. 1, 2 and 7. The acoustic signals frequency preferably cycles every ten (10) seconds in the "on" mode followed by five (5) seconds or less in the "off" mode (i.e. 10 seconds on, 5 seconds off) and range between 26 to 74 KHz using a complex "swept" frequency with multiple "peaks" in a range between 32 and 62 KHz. Acoustical signals 28 are transmitted by acoustical generator 31 in the ultrahigh frequency range of between 26-74 KHz at 105 decibels heard at a forward-radial distance of two feet from the sound source which may be acoustic speaker 27 or a piezoelectric device (not shown). Acoustical signals 28 are at such frequency as to irritate and frighten vermin such as rat 56 shown in FIG. 1. Should acoustical signals 28 not dissuade or discourage rat 56 from proceeding along mooring line 30, electric grid 13 which is joined to discharge capacitor 21 as shown in FIG. 2 will deliver an electric shock to rat 56 of 1-4 milliamps (mA) at 0.5 seconds duration if rat 56 touches electric grid 13. Discharge capacitor 21 preferably cycles to a full electric load within two seconds or less after being discharged and should be able to discharge a minimum of 10,000 times over a seven day period at the 1 mA setting. The milliamp range can be adjusted from a minimum 1 to a maximum 4 range by step rotary dial 45 (FIG. 2) or similar device (not shown) on acoustical generator housing 32. Acoustical on/off shock switch 35 is also seen in FIG. 4 along with LEDs 37, 37' which are lit when respectively acoustical switch 34 and shock switch 35 are on. LEDs 37, 37' are mounted on the exterior of acoustical generator housing 32 to indicate the mode of operation of rat guard 10, either acoustic, shock or both acoustic and shock modes.

Figure 8:
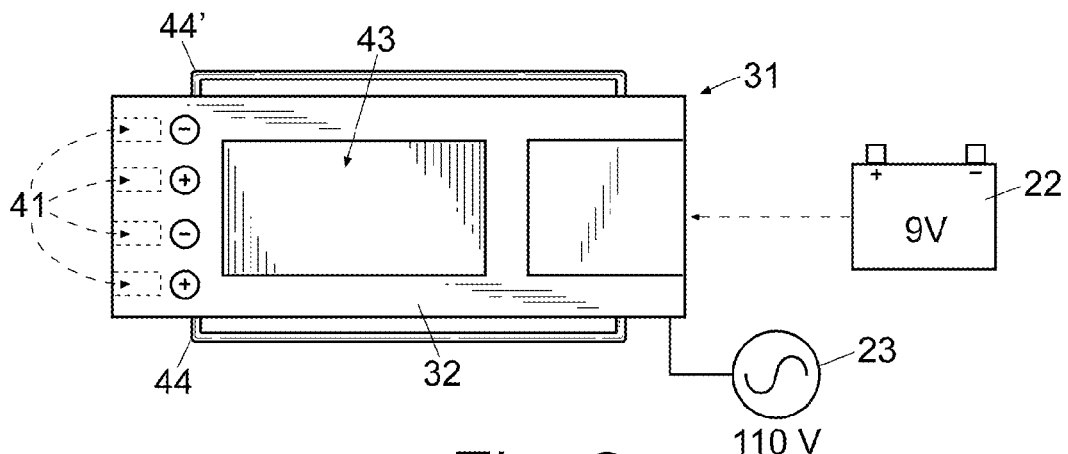
FIG. 8 depicts a bottom view of the acoustical generator without alternate power sources.

In FIGS. 2 and 8, alternate power sources are shown by DC power source battery 22 which is a conventional nine (9) volt battery and 110 volt AC power source 23 which may alternatively be wired for a 220 volt power supply (not shown). Rat guard 10 preferably operates on DC power for a period of seven days or indefinitely when joined to an AC power supply. Four (4) connectors 41 are shown in acoustical generator housing 32 in FIGS. 4 and 6 in which two (2) are connected to conductors 25, 25'. The other two (2) connectors 41 provided allow for connection of a second electric grid 13 if desired. The interior components of housing 32 may be potted in order to protect them from rain, snow, or accidental submergence in water.

In FIG. 8 a bottom view of acoustical generator housing 32 is seen with magnet 43 which is a conventional magnetic material strip affixed thereto. Magnet 43 can be used to affix acoustical generator 31 to the sides of a boat or other ferrous location or object.

The preferred method of using rat guard 10 as described herein to prevent vermin such as rat 56 from boarding or disembarking a ship such as ship 50 seen in FIG. 1 along a mooring line such as mooring line 30 includes the step of affixing sheath 12 which is held in place by hook and loop strip 29 at a desirable location along mooring line 30. Shield 11 is then placed over sheath 12 by manually pulling apart micro-hook material 26 along radial slot 19 and positioning central opening 16 around sheath 12 on mooring line 30 whereby radial slot 19 can be closed by manually pressing micro-hook material 26 together. Insulating pad 15 is then placed over and around sheath 12 as seen in FIGS. 3 and 4. Electric grid 13 can then be affixed to pad 15 on sheath 12 and joined by male plugs 24, 24' to electrical connectors 14, 14' on shield 11. Next, acoustical generator 31 is affixed by magnet 43 on acoustical generator housing 32 to ship 50 and connectors 14, 14' are respectively joined to conductors 25, 25' which are in turn joined to acoustical generator 31 by connectors 41, 41'. Battery power is then activated by turning acoustical switch 34 and shock switch 35 to the on position. As vermin such as rat 56 shown in FIG. 1 approaches shield 11, rat 56 is first frightened by acoustical signals 28 generated therefrom. If rat 56 is not sufficiently frightened away from a boarding attempt, by stepping on electric grid 13 rat 56 will be sufficiently shocked by the electricity from discharge capacitor 21 to cause rat 56 to retreat. Should acoustical signals 28 and discharge capacitor 21 not deter boarding rat 56, shield 11 presents another obstacle in which the size and shape will prevent advancement of rat 56 or other vermin along mooring line 30 to ship 50.

Rats or other vermin which may be on ship 50 will be frightened by acoustical signals 28 as they attempt to disembark along mooring line 30 and return to their ship location.

Should acoustical signals 28 not prevent disembarkment, the vermin upon approach to rat guard 10 must then attempt to transverse shield 12. If successful, grid 13 will then shock and deter further advancement by the vermin toward the shore or dock.

Another method of attaching acoustical generator 31 to a suitable location such as a rope, railing or cable utilizes belt 38 (FIG. 8) positioned in housing loops 44, 44' on acoustical generator housing 32. Loops 44, 44' are rigidly affixed to the sides of acoustical generator housing 32 as shown for example in FIGS. 6 and 8. Belt 38 can be tightened around a selected rope, cable or other object to mount acoustical generator 31. As is conventional buckle 39 is connected in one of holes 40 in belt 38 for stability to tightly secure belt 38 to a suitable cable or the like.

The illustrations and examples provided herein are for explanatory purposes and are not intended to limit the scope of the appended claims.

I claim:

1. A method of preventing vermin from boarding or disembarking a ship having a mooring line attached to a dock, the method comprising the steps of:
    a) providing a rat guard having a shield connected to electrical circuitry and defining a central opening with a radial slot sized to receive the mooring line therein, the central opening being in communication with the radial slot, an electric grid connected to the electrical circuitry and defining an outer surface completely exposed, an acoustical generator connected to the electrical circuitry, and an electrical connector affixed to the shield at a location spaced away from the central opening and the radial slot;
    b) attaching the shield to the mooring line;
    c) encircling the mooring line with the exposed electric grid;
    d) activating the electrical circuitry;
    e) allowing a rat to contact the exposed electric grid; and
    f) shocking the rat with the exposed electric grid to deter progress along the mooring line.

2. The method of claim 1 further comprising the step of impacting the rat with acoustical signals from the acoustical generator.

3. The method of claim 1 wherein providing an acoustical generator comprises the step of positioning the acoustical generator on the ship.

4. The method of claim 3 further comprising the step of activating the electrical circuitry by connecting the acoustical generator to a power source.

5. The method of claim 4 further comprising the step of generating acoustical signals in the direction of the shield.

6. The method of claim 5 wherein generating acoustical signals further comprises the step of emanating an ultrasonic acoustic signal in the 26-74 KHz range.

7. The method of claim 4 further comprising the step of providing a DC power source.

8. The method of claim 1 further comprising the steps of:
    a) providing a sheath;
    b) affixing the sheath to the mooring line; and
    c) placing the shield over the sheath for a stable engagement with the mooring line.

9. The method of claim 8 wherein providing a sheath further comprises the step of providing a sheath with a hook and loop strip.

10. The method of claim 8 further comprising the steps of:
    a) providing an insulating pad;
    b) placing the insulating pad over the sheath; and
    c) affixing the electric grid over the insulating pad.

11. The method of claim 10 further comprising the step of providing an adjustable discharge capacitor attached to the electrical circuitry.

12. The method of claim 11 wherein providing an adjustable discharge capacitor comprises the step of providing an adjustable discharge capacitor which provides a current output between one and four milliamps.

13. A method of preventing vermin from boarding or disembarking a ship having a mooring line attached to a dock, the method comprising the steps of:
    a) providing a rat guard having a non-absorbent flexible shield defining a central circular opening with a radial slot sized to receive the mooring line therein, the central circular opening being in communication with the radial slot, a micro-hook material attached to the shield proximate the central opening and radial slot, a sheath for affixing to the mooring line, a grid pad for attaching to the sheath, an exposed electric grid for encircling the mooring line about the grid pad, an electrical connector affixed to the shield via a male plug, an acoustical generator in communication with the shield, and electrical circuitry positioned within the acoustical generator and attached to the electric grid, the acoustical generator and an adjustable discharge capacitor;
    b) attaching the sheath to the mooring line;
    c) attaching the grid pad to the sheath;
    d) attaching the shield overtop the sheath on the mooring line;
    e) encircling the grid pad with the electric grid;
    f) activating the electrical circuitry;
    g) allowing a rat to contact the electric grid; and
    h) shocking the rat with the electric grid to deter progress along the mooring line.

14. The method of claim 13 wherein activating the electrical circuitry further comprises the step of connecting the acoustical generator to a power source.

15. The method of claim 14 further comprising the step of impacting the rat with acoustical signals from the acoustical generator.

16. The method of claim 15 wherein impacting the rat with acoustical signals further comprises the step of emanating an ultrasonic acoustic signal in the 26-74 KHz range.

17. The method of claim 13 wherein providing an adjustable discharge capacitor further comprises the step of providing an adjustable discharge capacitor having a current output between one and four milliamps.

18. The method of claim 13 wherein providing a sheath further comprises the step of providing a sheath with a hook and loop strip.

* * * * *